United States Patent
Watarai et al.

(10) Patent No.: US 9,623,932 B2
(45) Date of Patent: Apr. 18, 2017

(54) BICYCLE DERAILLEUR (71) Applicant: Shimano Inc., Sakai, Osaka (JP)

(72) Inventors: Etsuyoshi Watarai, Osaka (JP); Naohiko Yamada, Osaka (JP); Souta Yamaguchi, Osaka (JP); Kenji Ose, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 118 days.

(21) Appl. No.: 14/566,003

(22) Filed: Dec. 10, 2014

(65) Prior Publication Data

US 2016/0167739 A1    Jun. 16, 2016

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16C 1/10* | (2006.01) |
| *B62M 9/127* | (2010.01) |
| *B62M 9/124* | (2010.01) |
| *B62M 9/137* | (2010.01) |

(52) U.S. Cl.
CPC ............ *B62M 9/127* (2013.01); *B62M 9/124* (2013.01); *B62M 9/137* (2013.01)

(58) Field of Classification Search
CPC .... B62M 9/127; B62M 9/1242; B62M 9/126; B62M 9/124; B62M 9/125
USPC ................ 474/80; 74/502.2, 502.4
See application file for complete search history.

(56) References Cited

U.S. PATENT DOCUMENTS

| | | | | |
|---|---|---|---|---|
| 2,149,754 | A * | 3/1939 | Whiteford | H03J 9/00 334/8 |
| 4,051,738 | A * | 10/1977 | Dian | B62M 9/125 474/82 |
| 4,198,873 | A * | 4/1980 | Nagano | B62M 9/1244 474/82 |
| 4,833,937 | A * | 5/1989 | Nagano | B62M 9/127 474/82 |
| 4,903,541 | A * | 2/1990 | Shiota | F16C 1/226 403/105 |
| 5,809,840 | A * | 9/1998 | Oda | B62J 23/00 74/500.5 |
| 5,836,844 | A * | 11/1998 | Yoshida | B62M 9/125 411/353 |
| 5,946,978 | A * | 9/1999 | Yamashita | B62K 23/06 188/24.11 |
| 6,405,613 | B1 * | 6/2002 | Lim | B62M 25/02 474/80 |
| 6,419,602 | B1 * | 7/2002 | Soon | B62M 9/00 474/80 |

(Continued)

*Primary Examiner* — Henry Liu
(74) *Attorney, Agent, or Firm* — Global IP Counselors, LLP (57) ABSTRACT

A bicycle derailleur is basically provided with a base member, a movable member, a coupling structure and an attachment member. The base member is configured to be mounted to a bicycle. The base member has an inner wire guide. The inner wire guide has an inlet portion and an outlet portion. The movable member supports a chain guide. The coupling structure movably couples the movable member to the base member so that the movable member is selectively movable relative to the base member. The attachment member is detachably and/or rotatably attached to the outlet portion of the inner wire guide.

18 Claims, 5 Drawing Sheets

(56) References Cited

U.S. PATENT DOCUMENTS

| | | | | |
|---|---|---|---|---|
| 6,675,672 B2* | 1/2004 | Ose | B62K 23/06 | 116/28.1 |
| 7,083,035 B2* | 8/2006 | Noguchi | B62K 23/06 | 192/111.11 |
| 7,318,784 B2* | 1/2008 | Onogi | B62M 9/126 | 474/80 |
| 7,396,304 B2* | 7/2008 | Shahana | B62M 9/127 | 474/80 |
| 7,469,617 B2* | 12/2008 | Basile | F16C 1/22 | 74/501.5 R |
| 7,614,972 B2* | 11/2009 | Oseto | B62M 9/1244 | 474/80 |
| 7,824,285 B2* | 11/2010 | Tan | B62M 9/1244 | 474/80 |
| 8,057,332 B2* | 11/2011 | Takachi | B62M 9/127 | 474/80 |
| 8,100,032 B2* | 1/2012 | Boehm | B60T 11/046 | 74/489 |
| 8,105,193 B2* | 1/2012 | Oseto | B62M 9/126 | 474/144 |
| 8,678,964 B2* | 3/2014 | Lin | B62M 9/124 | 474/80 |
| 9,327,792 B2* | 5/2016 | Johnson | B62K 23/04 | |
| 2004/0110587 A1* | 6/2004 | Shahana | B62J 23/00 | 474/80 |
| 2005/0176537 A1* | 8/2005 | Matsumoto | B62M 11/145 | 474/80 |
| 2005/0192138 A1* | 9/2005 | Sze | B62M 9/126 | 474/78 |
| 2006/0058135 A1* | 3/2006 | Shahana | B62M 9/127 | 474/82 |
| 2006/0122016 A1* | 6/2006 | Hee | B62M 1/36 | 474/80 |
| 2006/0135301 A1* | 6/2006 | Shahana | B62M 9/1248 | 474/82 |
| 2007/0026985 A1* | 2/2007 | Yamaguchi | B62M 9/1242 | 474/82 |
| 2008/0153639 A1* | 6/2008 | Tan | B62M 9/127 | 474/80 |
| 2009/0197718 A1* | 8/2009 | Nagasawa | B62M 9/126 | 474/80 |
| 2009/0247334 A1* | 10/2009 | Takachi | B62M 9/126 | 474/82 |
| 2009/0275429 A1* | 11/2009 | Deguchi | B62M 9/125 | 474/80 |
| 2010/0004079 A1* | 1/2010 | Watarai | B62M 9/125 | 474/80 |
| 2010/0093472 A1* | 4/2010 | Oseto | B62M 9/126 | 474/80 |
| 2010/0184545 A1* | 7/2010 | Takachi | B62M 9/127 | 474/80 |
| 2011/0048161 A1* | 3/2011 | Shipman | F16C 1/16 | 74/502.2 |
| 2011/0160013 A1* | 6/2011 | Wehage | B62M 9/1244 | 474/80 |
| 2012/0258826 A1* | 10/2012 | Lin | B62M 9/1242 | 474/80 |
| 2013/0079184 A1* | 3/2013 | Yamaguchi | B62M 9/124 | 474/80 |
| 2013/0281237 A1* | 10/2013 | Lin | B62M 9/124 | 474/80 |
| 2014/0018199 A1* | 1/2014 | Shahana | B62M 9/126 | 474/82 |
| 2014/0155206 A1* | 6/2014 | Johnson | B62M 9/124 | 474/80 |
| 2014/0235383 A1* | 8/2014 | Wesling | F16H 9/06 | 474/80 |
| 2015/0031483 A1* | 1/2015 | Yamaguchi | B62M 9/126 | 474/80 |

* cited by examiner

BICYCLE DERAILLEUR

BACKGROUND

Field of the Invention

This invention generally relates to a bicycle derailleur. More specifically, the present invention relates to a bicycle derailleur having an inner wire guide.

Background Information

A bicycle typically uses a chain drive transmission for transmitting a pedaling force to a rear wheel. The chain drive transmission of a bicycle often uses one or two derailleurs to selectively move a chain from one of a plurality of sprockets to another for changing speeds of the bicycle. A typical derailleur has a base member, a movable member supporting a chain guide and a linkage assembly (e.g., a moving mechanism) coupled between the base member and the movable member so that the chain guide moves laterally relative to the base member. The linkage assembly typically includes a pair of pivotal links pivotally coupled to both the base member and the movable member. A spring typically biases the chain guide to either an innermost or outermost position relative to the sprockets. A Bowden-type control cable is typically coupled between the derailleur and a conventional shift control device. The Bowden-type control cable has an outer casing (sheath) and an inner wire. The inner wire is slidably disposed within the outer casing. Thus, the chain guide of the derailleur can be moved laterally by moving the linkage assembly via the inner wire. Pulling the inner wire moves the movable member and the chain guide against the biasing force of the spring, while releasing the inner wire causes the movable member and the chain guide to move due to the biasing force of the spring. Some rear derailleurs have an inner wire guide disposed on the base member for guiding the inner wire. A metal bush is sometimes fixedly mounted in a through bore of the inner wire guide of the rear derailleur by a swaging process.

SUMMARY

Generally, the present disclosure is directed to various features of a bicycle derailleur. In one feature presented in this disclosure, a bicycle derailleur is provided with an inner wire guide for guiding an inner wire of a control cable.

It has been discovered that in the above mentioned rear derailleur having an inner wire guide, it is difficult to exchange the metal bush with new one when the old one is worn out, because the metal bush is fixed in the through bore of the inner wire guiding portion. Accordingly, there is need to easily exchange an old metal bush with a new one.

In view of the state of the known technology and in accordance with a first aspect of the present disclosure, a bicycle derailleur is provided that basically comprises a base member, a movable member, a coupling structure and an attachment member. The base member is configured to be mounted to a bicycle. The base member has an inner wire guide. The inner wire guide has an inlet portion and an outlet portion. The movable member supports a chain guide. The coupling structure movably couples the movable member to the base member so that the movable member is selectively movable relative to the base member. The attachment member is detachably attached to the outlet portion of the inner wire guide. With this configuration, the inner wire guide can be detached and easily replaced.

In accordance with a second aspect of the present invention, the bicycle derailleur according to the first aspect is configured so that the attachment member is rotatably disposed on the outlet portion of the inner wire guide.

In accordance with a third aspect of the present invention, the bicycle derailleur according to the first aspect is configured so that the attachment member is rotatably disposed in a through bore of the outlet portion of the inner wire guide.

In accordance with a fourth aspect of the present invention, the bicycle derailleur according to the third aspect is configured so that the attachment member has an inner bore having an oval cross section.

In accordance with a fifth aspect of the present invention, the bicycle derailleur according to the third aspect further comprises a fastener securing the attachment member within the through bore of the outlet portion of the inner wire guide.

In accordance with a sixth aspect of the present invention, the bicycle derailleur according to the fifth aspect is configured so that the fastener is a set screw that is screwed into a threaded bore of the inner wire guide.

In accordance with a seventh aspect of the present invention, the bicycle derailleur according to the sixth aspect is configured so the threaded bore is disposed on periphery of the outlet portion of the inner wire guide.

In accordance with an eighth aspect of the present invention, the bicycle derailleur according to the fifth aspect is configured so that the attachment member includes an annular groove that receives a portion of the fastener such that the attachment member is rotatably disposed in the through bore of the outlet portion of the inner wire guide.

In accordance with a ninth aspect of the present invention, the bicycle derailleur according to the eighth aspect is configured so that the attachment member has an inner bore having an oval cross section.

In accordance with a tenth aspect of the present invention, the bicycle derailleur according to the first aspect is configured so that the attachment member is a bushing.

In accordance with an eleventh aspect of the present invention, a bicycle derailleur is provided that basically comprises a base member, a movable member, a coupling structure and an attachment member. The base member is configured to be mounted to a bicycle. The base member has an inner wire guide. The inner wire guide has an inlet portion and an outlet portion. The movable member supports a chain guide. The coupling structure movably couples the movable member to the base member so that the movable member is selectively movable relative to the base member. The attachment member is rotatably attached to the outlet portion of the inner wire guide.

In accordance with a twelfth aspect of the present invention, the bicycle derailleur according to the eleventh aspect is configured so that the attachment member has an inner bore having an oval cross section.

In accordance with a thirteenth aspect of the present invention, the bicycle derailleur according to the eleventh aspect further comprises a fastener securing the attachment member within a through bore of the outlet portion of the inner wire guide.

In accordance with a fourteenth aspect of the present invention, the bicycle derailleur according to the thirteenth aspect is configured so that the fastener is a set screw that is screwed into a threaded bore of the inner wire guide.

In accordance with a fifteenth aspect of the present invention, the bicycle derailleur according to the fourteenth aspect is configured so that the threaded bore is disposed on periphery of the outlet portion of the inner wire guide.

In accordance with a sixteenth aspect of the present invention, the bicycle derailleur according to the thirteenth aspect is configured so that the attachment member includes an annular groove that receives a portion of the fastener such that the attachment member is rotatably disposed in the through bore of the outlet portion of the inner wire guide.

In accordance with a seventeenth aspect of the present invention, the bicycle derailleur according to the sixteenth aspect is configured so that the attachment member has an inner bore having an oval cross section.

In accordance with an eighteenth aspect of the present invention, the bicycle derailleur according to the eleventh aspect is configured so that the attachment member is a bushing.

Also other objects, features, aspects and advantages of the disclosed bicycle derailleur will become apparent to those skilled in the art from the following detailed description, which, taken in conjunction with the annexed drawings, discloses several embodiments of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
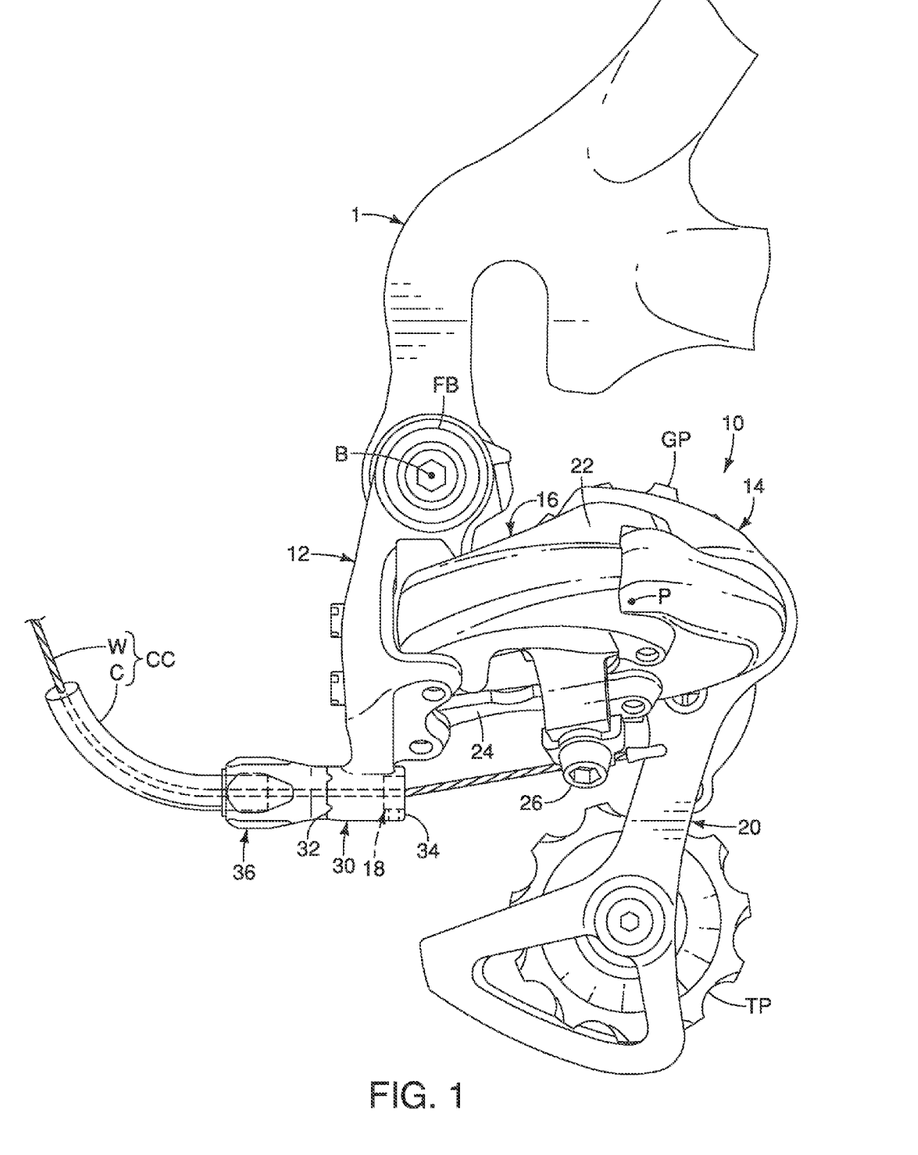
FIG. 1 is an outside elevational view of a rear portion of a bicycle having a rear derailleur having an attachment member mounted in a through bore of an inner wire guide in accordance with a first embodiment.

Referring initially to FIG. 1, a portion (i.e., a bicycle frame) of a bicycle 1 is illustrated that includes a bicycle derailleur 10 in accordance with a first embodiment. Here, in the first embodiment, the bicycle derailleur 10 is a rear derailleur that is cable operated by a bicycle control cable CC. However, it will be apparent to those skilled in the bicycle field from this disclosure that present invention can be applied to a front derailleur if needed and/or desired.

As seen in FIG. 1, the bicycle derailleur 10 basically comprises a base member 12, a movable member 14, a coupling structure 16 and an attachment member 18. The base member 12 is configured to be mounted to the bicycle 1. In particular, the base member 12 is mounted to the bicycle 1 by a fixing bolt FB. The fixing bolt FB forms a B-axle of the bicycle derailleur 10. The base member 12 is pivotally mounted on the fixing bolt FB for limited pivotal movement about a B-axis (labeled B in FIG. 1) in a conventional manner. While the fixing bolt FB is attached directly to the frame of the bicycle 1 in the first embodiment, it will be apparent to those skilled in the bicycle field from this disclosure that other fixing arrangements are possible.

The movable member 14 supports a chain guide 20. In particular, the chain guide 20 is pivotally mounted to the movable member 14 to rotate around a rotational axis P with respect to the movable member 14. The rotational pivot axis P is sometimes called the P-axis of the rear derailleur. The chain guide 20 is basically formed by a pair of chain cage plates that rotatably supports a tension pulley TP and a guide pulley GP.

In the first embodiment, the coupling structure 16 is a linkage having a first link member 22 and a second link member 24. The link members 22 and 24 are pivotally connected to the base member 12 and the movable member 14 to define a four bar linkage arrangement. The first link member 22 has an inner wire anchor 26, which includes a washer and a bolt that is screwed into a hole of the first link member 22. The coupling structure 16 movably couples the movable member 14 to the base member 12 so that the movable member 14 is selectively movable relative to the base member 12. In particular, the movable member 14 moves relative to the base member 12 in response to actuation of the control cable CC.

In the first embodiment, the control cable CC is a Bowden-type control cable that has an outer casing C and an inner wire W. The inner wire W is slidably disposed within the outer casing C. Thus, the chain guide 20 of the derailleur 10 can be moved laterally by moving the coupling structure 16 via the inner wire W. Pulling the inner wire W moves the chain guide 20 against the biasing force of the spring (not shown), while releasing the inner wire W causes the chain guide 20 to move due to the biasing force of the spring (not shown).

Figure 2:
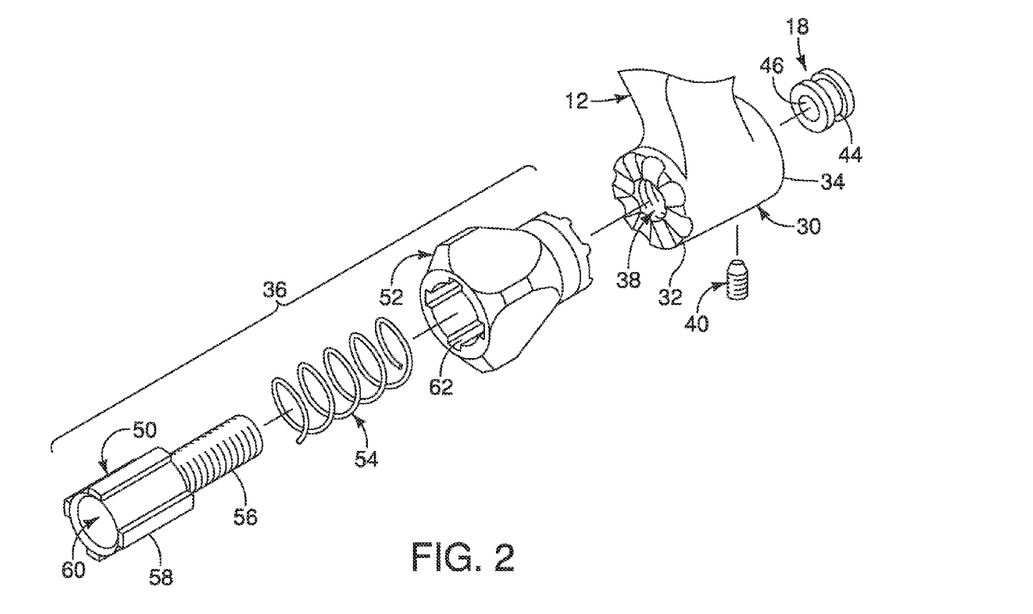
FIG. 2 is a perspective view of the inner wire guide and the cable adjuster of the bicycle derailleur illustrated in FIG. 1.
Figure 3:
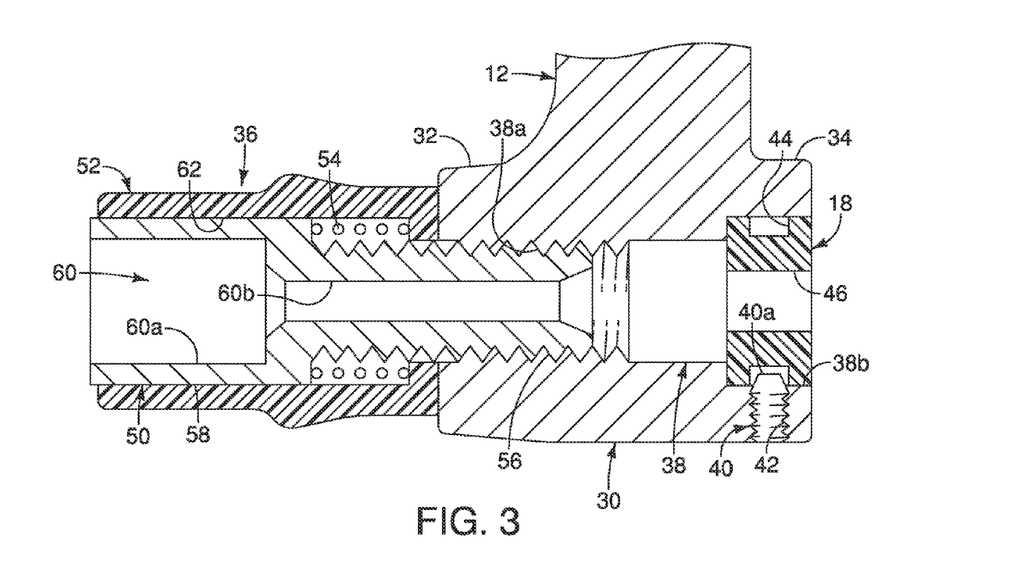
FIG. 3 is a longitudinal cross sectional view of the inner wire guide and the cable adjuster of the bicycle derailleur illustrated in FIGS. 1 and 2.

In the first embodiment, the base member 12 has an inner wire guide 30. The inner wire guide 30 has an inlet portion 32 and an outlet portion 34. The attachment member 18 is detachably attached to the outlet portion 34 of the inner wire guide 30. In the first embodiment, the attachment member 18 is rotatably attached to the outlet portion 34 of the inner wire guide 30. The base member 12 further has a cable adjuster 36 that is mounted to the inlet portion 32 of the inner wire guide 30. The bicycle derailleur 10 is basically conventional except for the attachment member 18 and the inner wire guide 30 of the base member 12. Thus, the overall construction of the conventional aspects of the bicycle derailleur 10 will only be briefly discussed herein.

In the first embodiment, the inner wire guide 30 is integrally formed with the base member 12. However, the inner wire guide 30 could be a separate member that is attached to the base member 12 by a suitable fastener. The inner wire guide 30 has a through bore 38 extending through the inlet portion 32 and the outlet portion 34. The through bore 38 includes a first (threaded) section 38a in the inlet portion 32 and a second (non-threaded) section 38b in the outlet portion 34. The cable adjuster 36 is attached to the first (threaded) section 38a of the through bore 38. The attachment member 18 is rotatably disposed in the second (non-threaded) section 38b of the through bore 38 of the outlet portion 34 of the inner wire guide 30.

A fastener 40 is provided for securing the attachment member 18 within the through bore 38 of the outlet portion 34 of the inner wire guide 30. In the first embodiment, the fastener 40 is a set screw that is screwed into a threaded bore 42 of the inner wire guide 30. The threaded bore 42 is disposed on periphery of the outlet portion 34 of the inner wire guide 30.

The attachment member 18 is preferably made of a metallic material. However, the attachment member 18 is not limited to being made of a metallic material. For example, the attachment member 18 can be made of a non-metallic material such as a hard resin. Also because the attachment member 18 is detachable from the inner wire guide 30, contamination such as mud, sand, etc. can be easily removed from the through bore 38 of the inner wire guide 30. In the first embodiment, the attachment member 18 is a bushing. Thus, the attachment member 18 is a single (one-piece) part that can be easily removed and replace without damaging either the attachment member 18 or the inner wire guide 30.

The attachment member 18 includes an annular groove 44 that receives a portion 40a of the fastener 40. With the arrangement of the fastener 40 and the annular groove 44, the attachment member 18 is rotatably disposed in the through bore 38 of the outlet portion 34 of the inner wire guide 30. Thus, to allow the attachment member 18 to freely rotate within the through bore 38, the portion 40a of the fastener 40 should be disposed in the annular groove 44 but should not contact the attachment member 18. However, if desired, the fastener 40 can be tightened fully against the attachment member 18 to retain the attachment member 18 in a desired position from a plurality of possible positions. Alternatively, the attachment member 18 can be formed of two or more separate grooves that are circumferential aligned to form a discontinuous circumferential groove. In this way, the attachment member 18 would freely rotate within the through bore 38 within a selected predetermined circumferential range.

The cable adjuster 36 includes a barrel bolt 50, an adjusting knob 52 and a spring 54. The barrel bolt 50 includes a threaded part 56 and a head part 58. The barrel bolt 50 has a through bore 60 extending through the threaded part 56 and the head part 58. The through bore 60 has a first section 60a that is dimensioned for receiving an end portion of the outer casing C of the control cable CC. The through bore 60 has a second section 60b that is dimensioned for receiving the inner wire W of the control cable CC therethrough. Thus, the first section 60a has a larger diameter than the second section 60b. The head part 58 has four axially extending ribs that engage an inner surface of a through bore 62 of the adjusting knob 52. The cable adjuster 36 is a conventional, and thus will not be discussed in further detail.

Figure 4:
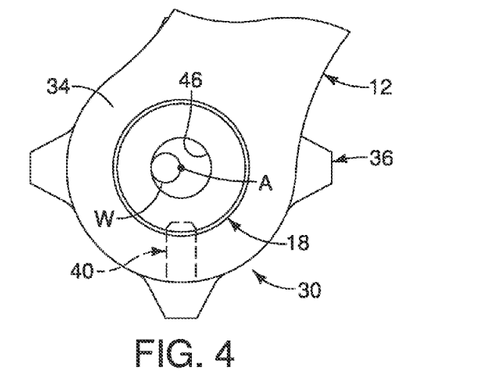
FIG. 4 is an elevational view of the inner wire guide and the cable adjuster of the bicycle derailleur illustrated in FIGS. 1 to 3 showing the inner wire located in the attachment member mounted in the through bore of the inner wire guide.
Figure 5:
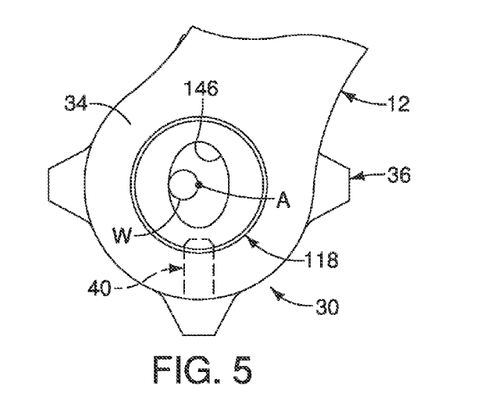
FIG. 5 is an elevational view, similar to FIG. 4, of an alternative attachment member mounted in the through bore of the inner wire guide in a first orientation to provide a first cable actuation ratio.
Figure 6:
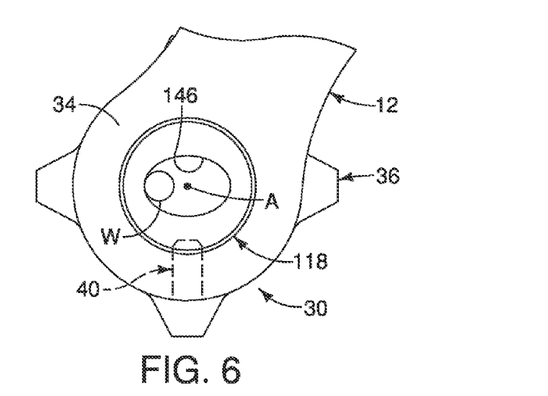
FIG. 6 is an elevational view, similar to FIG. 5, of the alternative attachment member mounted in the through bore of the inner wire guide in a second orientation to provide a second cable actuation ratio.

Referring now to FIGS. 5 and 6, an alternative attachment member 118 is mounted in the through bore 38 of the inner wire guide 30. The attachment member 118 is identical to the attachment member 18, except that the attachment member 118 has an inner bore 146 that has an oval cross section instead of a circular cross section of the inner bore 46 of the attachment member 18. By using the attachment member 118, a cable actuation ratio of the bicycle derailleur 10 can be adjusted. As seen in FIG. 5, the fastener 40 secures the attachment member 118 in a first orientation to provide a first cable actuation ratio. In other words, with the attachment member 118 retained in the first orientation of FIG. 5, the inner wire W is held at a first distance from the center axis A of the inner bore 146. In the first orientation of the attachment member 118, the inner wire W is held at the same distance from the center axis A as in the case of the inner bore 46 of the attachment member 18 that has a circular cross section as seen in FIG. 4. As seen in FIG. 6, the fastener 40 secures the attachment member 118 in a second orientation to provide a second cable actuation ratio. With the attachment member 118 retained in the second orientation of FIG. 6, the inner wire W is held at a second distance from the center axis A of the inner bore 146. Here, the inner wire W is held farther from the center axis A of the inner bore 146 than in the case of the inner bore 46 of the attachment member 18 that has a circular cross section as seen in FIG. 4. Of course, the fastener 40 can retain the attachment member 118 in any desired angular orientation with respect to the center axis A of the inner bore 146 to provide a desired cable actuation ratio.

Figure 7:
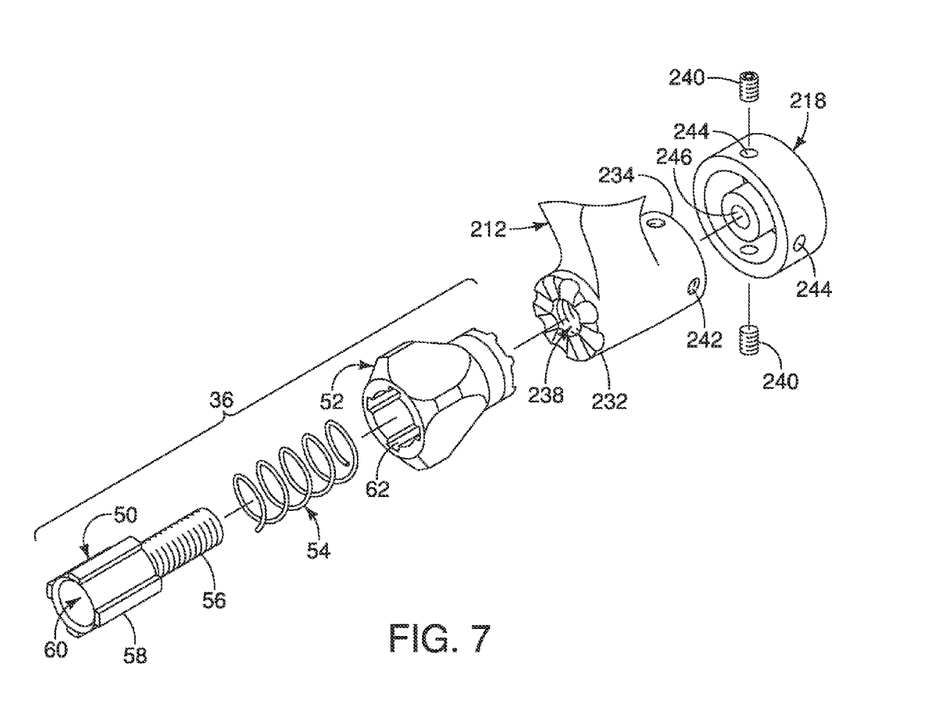
FIG. 7 is a perspective view of a portion of a modified rear derailleur having an inner wire guide in accordance with a second embodiment and the cable adjuster mounted thereto.
Figure 8:
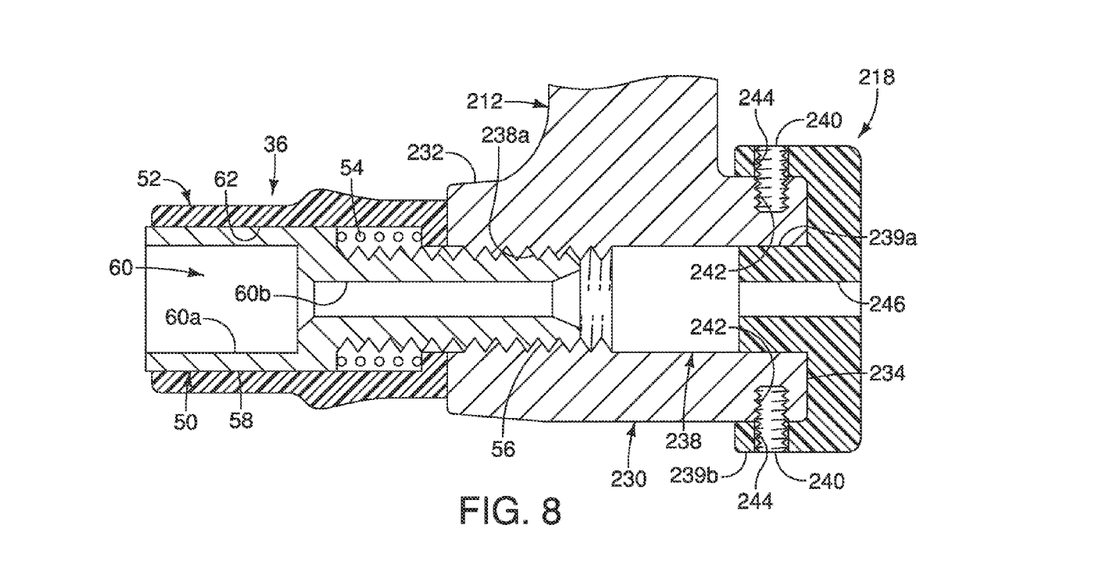
FIG. 8 is a longitudinal cross sectional view of the inner wire guide and the cable adjuster of the bicycle derailleur illustrated in FIG. 7.

Referring now to FIGS. 7 and 8, a portion of a modified base member 212 is illustrated in accordance with a second embodiment. Here, the base member 212 replaces the base member 12 of the rear derailleur 10. The base member 212 is identical to the base member 12, except that the base member 212 has a modified inner wire guide 230 to which a modified attachment member 218 is mounted in accordance with the second embodiment. In view of the similarity between the first and second embodiments, the descriptions of the parts of the second embodiment that are identical to the parts of the first embodiment will be omitted for the sake of brevity.

Similar to the first embodiment, the inner wire guide 230 of the base member 212 has an inlet portion 232 and an outlet portion 234. The inner wire guide 230 has a through bore 238 extending through the inlet portion 232 and the outlet portion 234. The through bore 238 includes a first (threaded) section 238a in the inlet portion 232 and a second (non-threaded) section 238b in the outlet portion 234. The cable adjuster 36 is attached to the first (threaded) section 238a of the through bore 238 in the same manner as the first embodiment. The attachment member 218 has an inner bore 246 and a tubular portion 239a that is rotatably disposed in the second (non-threaded) section 238b of the through bore 238 of the outlet portion 34 of the inner wire guide 230. The attachment member 218 has a collar portion 239b that is rotatably disposed on the outlet portion 234 of the inner wire guide 230. Two fasteners 240 are provided for securing the attachment member 218 on the outlet portion 234 of the inner wire guide 230. Here, the fasteners 240 are set screws that are screwed into two of four threaded bores 242 of the inner wire guide 230. While four of the threaded bores 242 are provided on the outlet portion 234 of the inner wire guide 230, fewer or more can be provided as need and/or desired. The threaded bores 242 are disposed on the periphery of the outlet portion 234 of the inner wire guide 230. The attachment member 218 is provided with non-threaded bores 244 for receiving the fasteners 240. Alternatively, the non-threaded bores 244 can be threaded as need and/or desired.

The threaded bores 242 are equally spaced apart around the periphery of the outlet portion 234 of the inner wire guide 230. Likewise, the non-threaded bores 244 equally spaced apart around the periphery of the attachment member 218. With this arrangement, a user can detach the attachment member 218 by unscrewing the fasteners 240, rotate the attachment member 218, and then screw the fasteners 240 in one or two different ones of the threaded bores 242. In this way, the user can change rotational angle of the attachment member 218 with respect to the inner wire guide 230.

Alternatively, the outlet portion 234 of the inner wire guide 230 can be provided with only one of the threaded bores 242 and the attachment member 218 can be provided with only one of the non-threaded bores 244. Also alternatively, the periphery of the outlet portion 234 of the inner wire guide 230 can be provided with an annular groove instead the threaded bores 242 and the non-threaded bores 244 of the attachment member 218 can be threaded.

Figure 9:
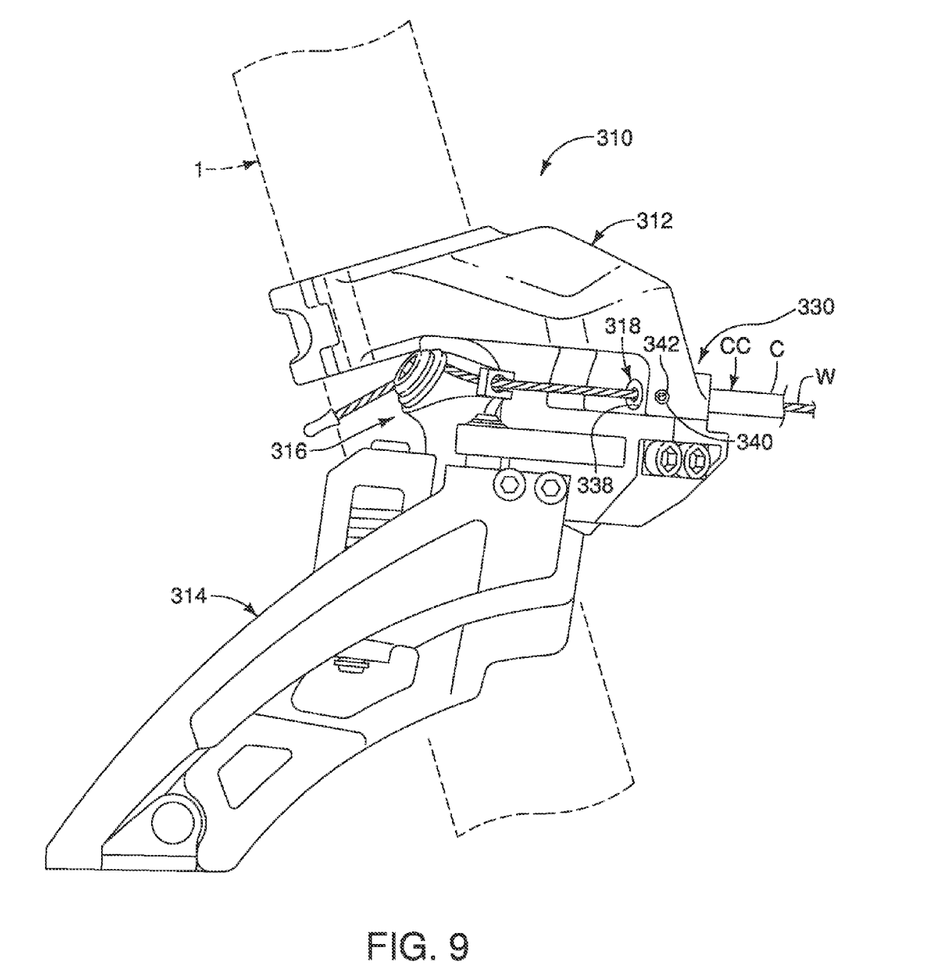
FIG. 9 is an outside elevational view of a front derailleur having an attachment member mounted in a through bore of an inner wire guide in accordance with the present invention.

Referring now to FIG. 9, a front derailleur 310 is illustrated that is provided with the present invention. Here, the bicycle derailleur 310 basically comprises a base member 312, a movable member 314, a coupling structure 316 and an attachment member 318. The base member 312 is configured to be mounted to a seat tube of the bicycle 1. The bicycle derailleur 310 is cable operated by a bicycle control cable CC that is identical to the bicycle control cable CC used with the bicycle derailleur 10. In this embodiment, the base member 312 has an inner wire guide 330. Similar to the first embodiment, the attachment member 318 is detachably attached to the inner wire guide 330. Also similar to the first embodiment, the attachment member 318 is rotatably attached to the inner wire guide 330. A fastener 340 is provided for securing the attachment member 318 within a through bore 338 of the inner wire guide 330. Also similar to the first embodiment, the fastener 340 is a set screw that is screwed into a threaded bore 342 of the inner wire guide 330. In view of the similarity between the parts of this embodiment and the first embodiment, the descriptions of the parts of this embodiment that are substantially identical to the parts of the first embodiment will be omitted for the sake of brevity. Alternatively, the attachment member 318 and the inner wire guide 330 can be configured similar to the attachment member 218 and the inner wire guide 230 as need and/or desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention.

The term "attached" or "attaching", as used herein, encompasses configurations in which an element directly attached to another element by directly affixing the element to the other element; and configurations in which the element is indirectly attached to the other element via intermediate member(s). This definition also applies to words of similar meaning, for example, "joined", "connected", "coupled", "mounted", "bonded", "fixed" and their derivatives. The term "detachably attached" or "detachably attaching", as used herein, encompasses configurations in which an element directly attached to another element by directly affixing the element to the other element while the element is detachable from the other element without damage; and configurations in which the element is indirectly attached to the other element via intermediate member(s) while the element is detachable from the other element and the intermediate member(s) without damage. This definition also applies to words of similar meaning, for example, "detachably joined", "detachably connected", "detachably coupled", "detachably mounted", "detachably bonded", "detachably fixed" and their derivatives.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
a base member configured to be mounted to a bicycle, the base member having an inner wire guide that is a non-detachable part of the base member, the inner wire guide having an inlet portion and an outlet portion;
a movable member supporting a chain guide;
a coupling structure movably coupling the movable member to the base member so that the movable member is selectively movable relative to the base member; and
an attachment member detachably attached to the outlet portion of the inner wire guide.

2. The bicycle derailleur according to claim 1, wherein the attachment member is rotatably disposed on the outlet portion of the inner wire guide.

3. A bicycle derailleur comprising:
a base member configured to be mounted to a bicycle, the base member having an inner wire guide, the inner wire guide having an inlet portion and an outlet portion;
a movable member supporting a chain guide;
a coupling structure movably coupling the movable member to the base member so that the movable member is selectively movable relative to the base member; and
an attachment member detachably attached to the outlet portion of the inner wire guide, the attachment member being rotatably disposed in a through bore of the outlet portion of the inner wire guide.

4. The bicycle derailleur according to claim 3, wherein the attachment member has an inner bore having an oval cross section.

5. The bicycle derailleur according to claim 3, further comprising
a fastener securing the attachment member within the through bore of the outlet portion of the inner wire guide.

6. The bicycle derailleur according to claim 5, wherein the fastener is a set screw that is screwed into a threaded bore of the inner wire guide.

7. The bicycle derailleur according to claim 6, wherein the threaded bore is disposed on periphery of the outlet portion of the inner wire guide.

8. The bicycle derailleur according to claim 5, wherein the attachment member includes an annular groove that receives a portion of the fastener such that the attachment member is rotatably disposed in the through bore of the outlet portion of the inner wire guide.

9. The bicycle derailleur according to claim 8, wherein the attachment member has an inner bore having an oval cross section.

10. The bicycle derailleur according to claim 1, wherein the attachment member is a bushing.

11. A bicycle derailleur comprising:
a base member configured to be mounted to a bicycle, the base member having an inner wire guide that is a non-detachable part of the base member, the inner wire guide having an inlet portion and an outlet portion;
a movable member supporting a chain guide;
a coupling structure movably coupling the movable member to the base member so that the movable member is selectively movable relative to the base member; and
an attachment member rotatably attached to the outlet portion of the inner wire guide.

12. The bicycle derailleur according to claim 11, wherein the attachment member has an inner bore having an oval cross section.

13. A bicycle derailleur comprising:
a base member configured to be mounted to a bicycle, the base member having an inner wire guide, the inner wire guide having an inlet portion and an outlet portion;
a movable member supporting a chain guide;
a coupling structure movably coupling the movable member to the base member so that the movable member is selectively movable relative to the base member;
an attachment member rotatably attached to the outlet portion of the inner wire guide; and
a fastener securing the attachment member within a through bore of the outlet portion of the inner wire guide.

14. The bicycle derailleur according to claim 13, wherein the fastener is a set screw that is screwed into a threaded bore of the inner wire guide.

15. The bicycle derailleur according to claim 14, wherein the threaded bore is disposed on periphery of the outlet portion of the inner wire guide.

16. The bicycle derailleur according to claim 13, wherein the attachment member includes an annular groove that receives a portion of the fastener such that the attachment member is rotatably disposed in the through bore of the outlet portion of the inner wire guide.

17. The bicycle derailleur according to claim 16, wherein the attachment member has an inner bore having an oval cross section.

18. The bicycle derailleur according to claim 11, wherein the attachment member is a bushing.

* * * * *